United States Patent
Benware

(10) Patent No.: US 7,216,280 B2
(45) Date of Patent: May 8, 2007

(54) METHOD OF GENERATING TEST PATTERNS TO EFFICIENTLY SCREEN INLINE RESISTANCE DELAY DEFECTS IN COMPLEX ASICS

(75) Inventor: Robert B. Benware, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 265 days.

(21) Appl. No.: 10/900,224

(22) Filed: Jul. 27, 2004

(65) Prior Publication Data

US 2005/0235188 A1    Oct. 20, 2005

Related U.S. Application Data

(60) Provisional application No. 60/564,102, filed on Apr. 20, 2004.

(51) Int. Cl.
G01R 31/28 (2006.01)
(52) U.S. Cl. ............ 714/738; 714/729; 714/736; 714/737; 714/741
(58) Field of Classification Search ............ None
See application file for complete search history.

(56) References Cited

U.S. PATENT DOCUMENTS

2002/0035708 A1 *   3/2002   Ishida et al. ............ 714/25

\* cited by examiner

Primary Examiner—Albert Decady
Assistant Examiner—John J. Tabone, Jr.
(74) Attorney, Agent, or Firm—Trexler, Bushnell, Giangiorgi, Blackstone & Marr, Ltd.

(57) ABSTRACT

A methodology for generating scan based transition patterns (i.e., ATPG pattern generation for transition delay faults ("TDF")) wherein when either a slow-to-rise (STR) or a slow-to-fall (STE) transition fault is detected, that specific fault is removed from a fault universe as well as its companion TDF, wherein the companion fault is a fault on the same node as the detected fault but has the opposite transition. In other words, if a slow-to-rise (STR) transition fault is detected, the slow-to-rise (STR) transition fault is removed from the fault universe as well as its corresponding slow-to-fall (STF) transition fault (and vise versa). By removing companion faults as well as those which are specifically detected, pattern generation run time is reduced as well as the total pattern count for the final delay test pattern.

7 Claims, 2 Drawing Sheets

METHOD OF GENERATING TEST PATTERNS TO EFFICIENTLY SCREEN INLINE RESISTANCE DELAY DEFECTS IN COMPLEX ASICS

RELATED APPLICATION (PRIORITY CLAIM)

The present application claims the benefit of U.S. Provisional Application Ser. No. 60/564,102, filed Apr. 20, 2004.

BACKGROUND

The present invention generally relates to the field of semiconductor tests, and more specifically relates to an Automatic Test Pattern Generation (ATPG) scan-based structural test.

Due to (among other reasons) increased operating frequencies and increased back end metal layers, delay related defects in random logic are becoming a more significant contributor to the overall defect density in semiconductor manufacturing. This trend in delay defect density is causing additional need to test for and reject die whose speed performance is inadequate due to the presence of such defects. Screening for delay defects has traditionally been performed via at-speed functional testing of the device. However, due to an increased ratio of internal nodes to external control and observation points (primary inputs and outputs, respectively), it is becoming increasingly difficult to create functional test patterns in a time and cost efficient manner.

In order to increase the testability of device, scan chains are often used. A scan chain is a connection of sequential elements converted into a shift register, which simplifies structural testing by providing additional control and observe points to internal nodes within a design. Generally, scan chain operations consist of shifting in test data, capturing system data and shifting out system responses.

In a functional test, functional vectors are used to simulate the design's functionality. Functional vectors are less efficient, grow exponentially in size as the design grows, deliver lower coverage, and are far more difficult to diagnose than functional tests.

Scan based structural testing is an effective solution for testing for delay defects as an alternative to functional testing. The most commonly practiced method of generating test vectors to screen delay faults relies on the transition delay fault (TDF) model. In a TDF fault model, a node can be either slow-to-rise (STR) or slow-to-fall (STF). In a conventional ATPG process, for each node in the circuit, a test vector is created to detect both a slow-to-rise and a slow-to-fall transition fault. This has proven to be an effective technique toward high quality test patterns. However, too many test vectors are generated and the processing time required to generate the vectors is too high for this test method to be cost effective.

Most current approaches toward reducing the test vector count are focused on compression techniques that try to either: 1) remove any redundancies in the patterns; or 2) group multiple patterns that do not have overlapping constraints. These compression techniques typically reduce the pattern count, which is desirable. However, the reduction comes at the price of increased pattern generation times. To combat the increased run times, techniques which have been used in the industry include: distributing the ATPG process to multiple computers; and using more efficient algorithms that take fewer steps to converge on a needed test vector.

While these approaches are not necessarily unacceptable, there is an efficiency barrier that will not be overcome by these techniques. True efficiency cannot be achieved due to the fact that a conventional transition delay fault model assumes that a manufacturing defect will cause either a slow-to-rise (STR) or a slow-to-fall (STF) transition fault. In reality, the vast majority of timing-related defects will cause both a slow-to-rise and a slow-to-fall transition timing fault. Because of the discrepancy between the real manufacturing defect and the idealized faulty circuit behavior, conventional transition delay fault models generate unnecessary test vectors, and cause unnecessary processing time to be spent targeting faults that will never be detected in the manufacturing test.

OBJECTS AND SUMMARY

An object of an embodiment of the present invention is to provide an improved methodology for generating scan based transition patterns.

Another object of an embodiment of the present invention is to provide a methodology for ATPG pattern generation for transition delay faults which results in a reduction in pattern generation run time and total pattern count for the final delay test pattern as compared to a conventional TDF ATPG methodology.

Briefly, and in accordance with at least one of the foregoing objects, an embodiment of the present invention provides a methodology (and associated apparatus) for generating scan based transition patterns (i.e., ATPG pattern generation for transition delay faults) wherein when either a slow-to-rise (STR) or a slow-to-fall (STF) transition fault is detected, that specific fault is removed from a fault universe (i.e., a set of faults) as well as its companion TDF fault, wherein the companion fault is a fault on the same node as the detected fault but has the opposite transition. In other words, if a slow-to-rise (STR) transition fault is detected, the slow-to-rise (STR) transition fault is removed from the fault universe as well as its corresponding slow-to-fall (STF) transition fault. Likewise, if a slow-to-fall (STF) transition fault is detected, the slow-to-fall (STF) transition fault is removed from the fault universe as well as its corresponding slow-to-rise (STR) transition fault.

BRIEF DESCRIPTION OF THE DRAWINGS

The organization and manner of the structure and operation of the invention, together with further objects and advantages thereof, may best be understood by reference to the following description, taken in connection with the accompanying drawings, wherein.

DESCRIPTION

Figure 1:
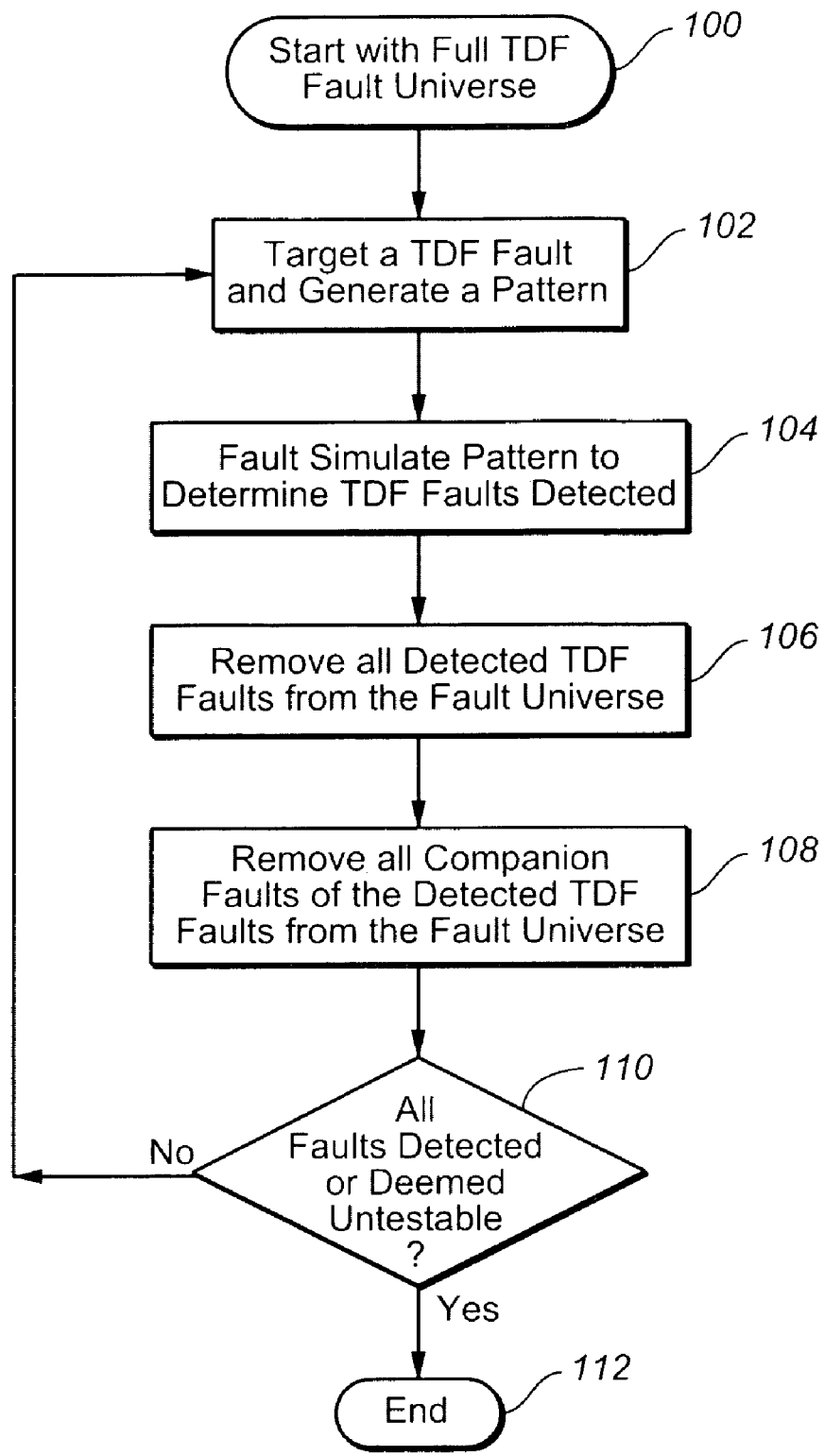
FIG. 1 illustrates a method for generating test patterns in accordance with an embodiment of the present invention.

While the invention may be susceptible to embodiment in different forms, there are shown in the drawings, and herein will be described in detail, specific embodiments of the invention. The present disclosure is to be considered an example of the principles of the invention, and is not intended to limit the invention to that which is illustrated and described herein.

An embodiment of the present invention provides a method for generating scan based transition patterns (i.e., ATPG pattern generation for transition delay faults) which assumes that timing-related defects cause both a slow-to-rise and a slow-to-fall transition timing fault. Because it is assumed that timing-related defects cause both a slow-to-rise and a slow-to-fall transition timing fault, it is only necessary to detect one of the two possible transitions at any given circuit node. As such, the method provides that when either a slow-to-rise (STR) or a slow-to-fall (STF) transition fault is detected, that specific fault is removed from a fault universe (i.e., a set of faults) as well as its companion TDF fault, wherein the companion fault is a fault on the same node as the detected fault but has the opposite transition. In other words, if a slow-to-rise (STR) transition fault is detected, the slow-to-rise (STR) transition fault is removed from the fault universe as well as its corresponding slow-to-fall (STF) transition fault. Likewise, if a slow-to-fall (STF) transition fault is detected, the slow-to-fall (STF) transition fault is removed from the fault universe as well as its corresponding slow-to-rise (STR) transition fault. By removing companion faults as well as those which are specifically detected, pattern generation run time is reduced as well as the total pattern count for the final delay test pattern (as compared to a conventional TDF ATPG methodology).

An embodiment of the present invention provides a methodology for the generation of scan based transition patterns specifically for the inline resistance fault (IRF) model. To detect an inline resistance fault, it is necessary to excite and observe a transition at a specific node. Because either a slow-to-rise (STR) or a slow-to-fall (STF) transition will satisfy this condition, the IRF fault universe is a subset of the TDF fault universe. However, since it is not known in advance which transition will be easier to detect, both remain in the initial fault universe. The flow chart in FIG. 1 describes the process for generating an ATPG pattern for the IRF model, where the process is in accordance with an embodiment of the present invention.

The process follows a standard methodology for ATPG pattern generation for transition delay faults with one exception. Initially, the fault lists for IRF and TDF pattern generation are identical (box 100 in FIG. 1). Then, a TDF fault is targeted and a pattern is generated to detect this fault (box 102 in FIG. 1). This pattern is then fault simulated to determine all faults detected by such pattern (box 104 in FIG. 1). During this process, any TDF fault that is detected is removed from the fault universe (box 106 in FIG. 1). At this point, the process in accordance with an embodiment of the present invention differs from a conventional ATPG process. The process in accordance with an embodiment of the present invention provides that once a TDF fault is detected, not only the TDF fault is removed from the fault universe but also its companion TDF fault (box 108 in FIG. 1), wherein a companion fault is defined as a fault on the same node as the detected fault but having the opposite transition. In the case of a slow-to-rise (STR) TDF fault detection on a given node, the slow-to-fall (STF) fault is the companion fault. In the case of a slow-to-fall (STF) TDF fault detection on a given node, the slow-to-rise (STR) fault is the companion fault. Once it has been determined that all faults have been detected or deemed untestable (box 110 in FIG. 1), the process ends (box 112 in FIG. 1).

Hence, the present invention provides for companion fault identification and dropping, for the purposes of creating delay test patterns against the IRF model. Two advantages of identifying and dropping companion faults are a reduction in pattern generation run time and a reduction in total pattern count for the final delay test pattern, as compared to standard TDF ATPG methodology.

Comparing IRF and TDF test coverage for a pattern generated according to the present invention verses a pattern generated according to conventional TDF ATPG methodology for two different ASICs, the IRF test coverage will typically be basically unchanged. However, there will typically be a reduction in TDF test coverage. This is expected due to the fault dropping of the IRF method of the present invention. As an example, use of the methodology described herein may reduce pattern count by 45% to 53%, and may reduce run time by 30% to 36%. The methodology described herein can also be used for fault grading purposes.

Figure 2:
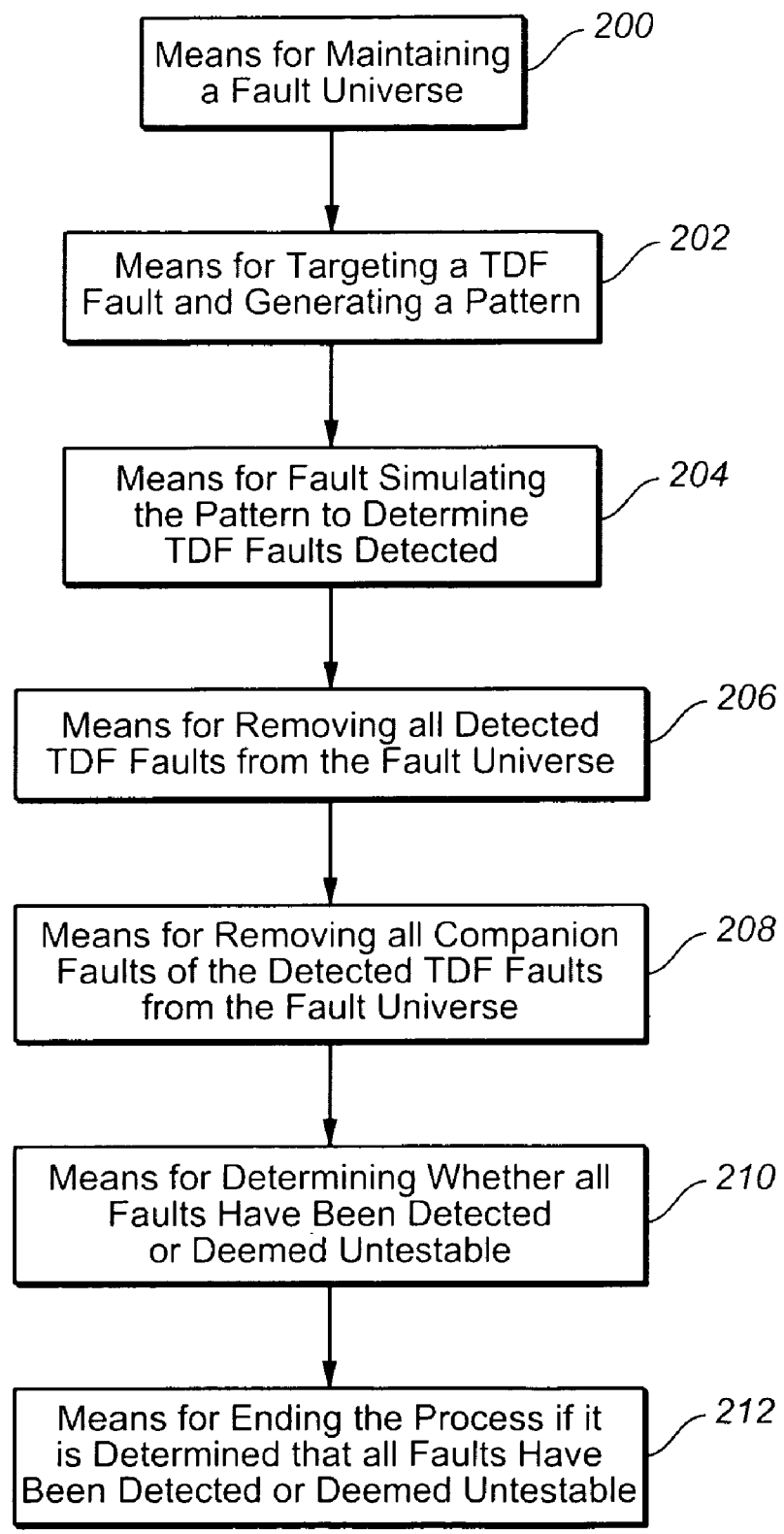
FIG. 2 illustrates an apparatus for generating test patterns in accordance with an embodiment of the present invention.

FIG. 2 illustrates an associated apparatus which can be employed to practice the method shown in FIG. 1. As shown, the apparatus includes means (such as code) for maintaining a fault universe (box 200 in FIG. 2), means (such as code) for targeting a TDF fault and generating a pattern (box 202 in FIG. 2), means (such as code) for fault simulating the pattern to determine TDF faults detected (box 204 in FIG. 2), means (such as code) for removing all detected TDF faults from the fault universe (box 206 in FIG. 2), means (such as code) for removing all companion faults of the detected TDF faults from the fault universe (box 208 in FIG. 2), means (such as code) for determining whether all faults have been detected or deemed untestable (box 210 in FIG. 2), and means (such as code) for ending the process (box 212 in FIG. 2) if it is determined that all faults have been detected or deemed untestable.

While embodiments of the present invention are shown and described, it is envisioned that those skilled in the art may devise various modifications of the present invention without departing from the spirit and scope of the appended claims. For example, the methodology described herein can be used not only for pattern generation purposes but also for fault grading purposes.

What is claimed is:

1. A method for generating scan based patterns for a plurality of transition delay faults, said method comprising:

maintaining a fault universe;

targeting at least one of the plurality of said transition delay faults and generating a pattern based on said at least one of the plurality of said transition delay faults;

fault simulating the pattern to determine if said at least one of the plurality of said transition delay faults is detected;

if said at least one of the plurality of said transition delay faults is detected, removing the detected at least one of the plurality of said transition delay faults as well as a companion fault of said detected transition delay fault from said fault universe even though said companion fault has not been detected.

2. A method as recited in claim 1, wherein the step of removing a said companion fault comprises removing a fault on a node which is the same as the detected transition delay fault but having the opposite transition.

3. A method as recited in claim 1, wherein the step of maintaining a said fault universe comprises maintaining a list of said plurality of transition delay faults.

4. A method as recited in claim 1, wherein the step of targeting at least one of the plurality of said transition delay faults and fault simulating the pattern comprises generating the pattern based on a slow-to-rise (STR) transition fault, and wherein the step of removing the detected as well as the companion fault comprises if the slow-to-rise (STR) transition fault is detected, removing the slow-to-rise (STR)

transition fault as well as its companion slow-to-fall (STF) transition fault from said fault universe.

5. A method as recited in claim 1, wherein the step of targeting at least one of the plurality of said transition delay faults and fault simulating the pattern comprises generating the pattern based on a slow-to-fall (STF) transition fault, and wherein the step of removing the detected as well as the companion fault comprises if the slow-to-fall (STE) transition fault is detected, removing the slow-to-fall (STF) transition fault as well as its companion slow-to-rise (STR) transition fault from said fault universe.

6. A method as recited in claim 1, wherein the step of targeting at least one of the plurality of said transition delay faults and fault simulating the pattern comprises generating the pattern based on a slow-to-rise (STR) transition fault, and wherein the step of removing the detected as well as the companion fault comprises if the slow-to-rise (STR) transition fault is detected, removing the slow-to-rise (STR) transition fault as well as its companion slow-to-fall (STE) transition fault from said fault universe, and wherein the step of targeting at least one of the plurality of said transition delay faults and fault simulating the pattern comprises generating the pattern based on a slow-to-fall (STF) transition fault, and wherein the step of removing the detected as well as the companion fault comprises if the slow-to-fall (STF) transition fault is detected, removing the slow-to-fall (STF) transition fault as well as its companion slow-to-rise (STR) transition fault from said fault universe.

7. A method as recited in claim 1, further comprising continuing until all of said plurality of transition delay faults are either detected or deemed untestable.

* * * * *